No. 806,971. PATENTED DEC. 12, 1905.
G. GOSSA.
INSTRUMENT FOR LINEAR MEASUREMENTS.
APPLICATION FILED MAY 26, 1905.
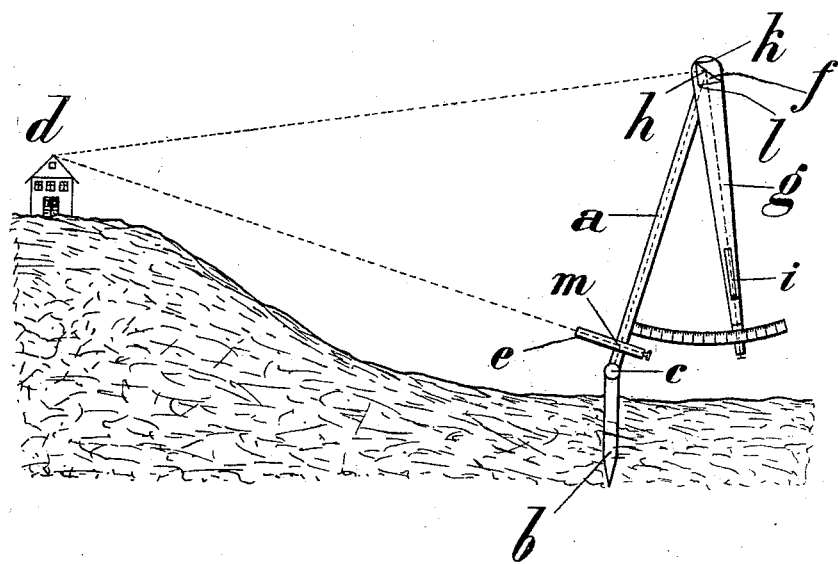
Witnesses
Inventor
Georg Gossa
by his Attorney

UNITED STATES PATENT OFFICE.

GEORG GOSSA, OF BRESLAU, GERMANY, ASSIGNOR OF ONE-THIRD TO ERWIN HEYBER, OF POST STROPPEN, GERMANY, AND ONE-THIRD TO MAX GOSSA, OF BRESLAU, GERMANY.

INSTRUMENT FOR LINEAR MEASUREMENTS.

No. 806,971.      Specification of Letters Patent.      Patented Dec. 12, 1905.

Application filed May 26, 1905. Serial No. 262,458.

*To all whom it may concern:*

Be it known that I, GEORG GOSSA, a subject of the King of Prussia, German Emperor, residing at Breslau, Germany, have invented certain new and useful Improvements in Instruments for Linear Measurements, of which the following is a specification.

This invention relates to improvements in instruments for linear measurement. For obtaining exact results the length of the base used in instruments for measuring distances must, as is known, be as great as possible. With a long base, however, measurement in a horizontal plane becomes inconvenient, since if a long cord or the like is used two persons situated at a distance apart are required to effect the measurement and if a rigid base is used instead of a flexible one a considerable amount of lateral space, which is not always available, is required. For these reasons it has been found desirable to use a long rigid base arranged in a vertical plane, the triangle determined by the base and the objective being of course also in a vertical plane. This allows of using the instrument in narrow spaces between houses or walls and on narrow footpaths in forests and the like. Measuring instruments with vertical rigid bases have, however, hitherto had the important disadvantage that the image thrown onto the prism at the upper end of the base had to be reflected several times in order to be projected into the telescope fixed to the lower end of the base. The repeated reflection involved, of course, loss of light. The instruments referred to were, moreover, complicated and difficult to handle, since they did not allow of using for directly measuring the angle the known arrangement of a right-angular reflecting-prism, rotatable within wide limits and adapted to indicate the angle by the amount of rotation it requires. This arrangement was rendered impracticable by the fact that with a long base the rays reflected by the prism would no longer reach the fixed telescope when the prism had been rotated through a certain angle and the instrument would only be available for measuring comparatively short distances.

The improved instrument to which the present invention relates is based on the known system of Stübendorf and comprises a rotatable prism arranged at the upper end of a rotatable base and an additional telescope or other suitable sighting instrument, which is arranged at the lower part of the instrument. The said telescope or sighting instrument is directed onto the said rotatable prism and is adapted to be rotated with the latter, so that the relative positions of the two parts do not change. For this purpose the prism is fixed to a rotatable arm, which also carries the telescope or sighting instrument.

One form of the invention is diagrammatically illustrated in the annexed drawing.

The rod $a$, forming the base, is pivotally connected at $c$ to the stake $b$, so that it can be rotated in a vertical plane. $e$ is a telescope fixed to the said rod with its axis perpendicular to the latter. The arm $g$, carrying the prism $f$, is pivotally connected to the rod $a$ at $h$. To the lower part of the said arm is connected an additional telescope $i$, directed toward the prism. The fulcrum $h$ of the arm $g$ coincides with the center of the hypotenuse of the prism triangle and the optical axis of the telescope $i$ is parallel with the side $k\ l$ of the said triangle.

When the stake has been driven into the ground, the rod $a$ is rotated until the telescope $e$ is directed on the object $d$, the distance of which is to be measured. Then the arm $g$ is rotated until the image reflected by the prism falls into the telescope $i$. The angle contained by the rod $a$ and arm $g$ is then equal to the angle at $d$. This angle can be directly read off the scale $n$ below the arm $g$ by means of a vernier or the like and forms the second factor required for determining the triangle $m\ d\ h$, the length of the base $a$ being known.

The instrument described is more particularly designed for military purposes.

What I claim as my invention, and desire to secure by Letters Patent of the United States, is—

1. In an instrument for linear measurement the combination of a rotatable base, a sighting instrument carried thereby, a rotatable reflecting-prism at the upper end of the base a second sighting instrument directed toward said prism and mounted integrally therewith and means for indicating the angle of rotation of the prism aforesaid, substantially as described.

2. In an instrument for linear measurement the combination of a rotatable base, a sighting instrument carried thereby, a rotatable arm pivoted to said base, a reflecting-prism carried by said arm, and a sighting instrument also carried by said arm and directed toward said prism substantially as described.

3. In an instrument for linear measurement the combination of a rotatable base, a sighting instrument carried thereby, a rotatable arm pivoted to said base, a reflecting-prism carried by said arm, a sighting instrument also carried by said arm and directed toward said prism and means for indicating the angle contained by the aforesaid base and arm substantially as described.

4. In an instrument for linear measurement the combination of a rotatable base, a sighting instrument carried thereby a rotatable arm pivoted to the upper end of said base, a right-angular reflecting-prism carried by said arm and a sighting instrument also carried by said arm and directed toward the prism substantially as described.

5. In an instrument for linear measurement the combination of a rotatable base, a sighting instrument carried thereby at right angles thereto, a rotatable arm pivoted to the upper end of said base, a right-angular reflecting-prism carried by said arm at its upper end, a sighting instrument also carried by said arm at the lower end thereof and directed toward said prism and means for indicating the angle contained by said base and arm substantially as described.

6. In an instrument for linear measurement the combination of a rotatable base, a sighting instrument carried thereby, a rotatable arm pivoted to the upper end of said base, a right-angular reflecting-prism carried by said arm at its upper end and having the center of its hypotenuse coinciding with the pivotal point of said arm, a sighting instrument also carried by said arm at the lower end thereof and directed toward said prism and means for indicating the angle contained by said base and arm substantially as described.

In witness whereof I have signed this specification in the presence of two witnesses.

GEORG GOSSA.

Witnesses:
Dr. PEPPBYLTOK,
ERNST KATZ.